Patented Jan. 8, 1952

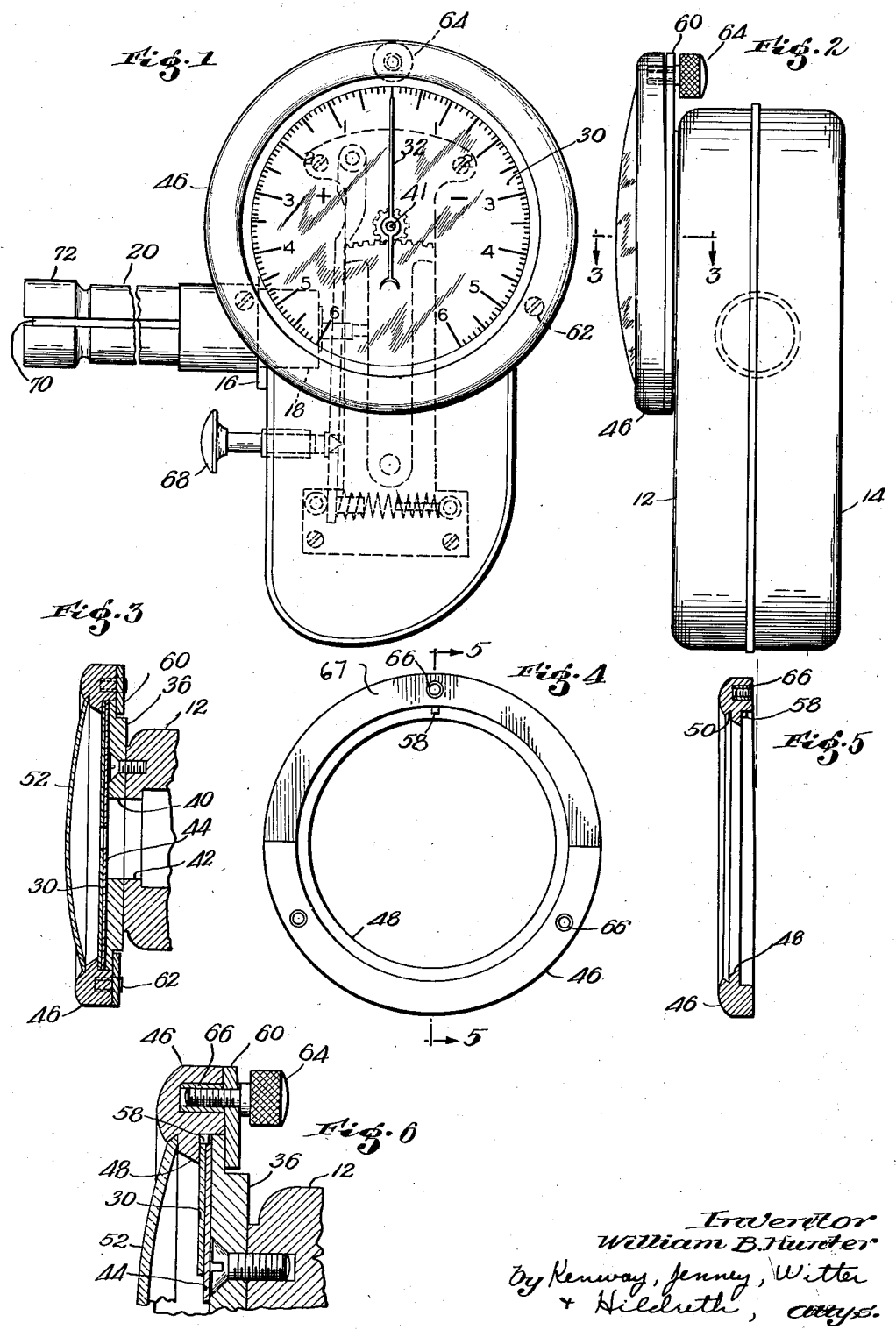

2,581,955

UNITED STATES PATENT OFFICE 2,581,955

DIAL MOUNTING FOR MICROMETER CALIPERS

William B. Hunter, Wellesley, Mass., assignor to The Comtor Company, Waltham, Mass., a corporation of Massachusetts Original application June 24, 1944, Serial No. 541,138. Divided and this application July 26, 1949, Serial No. 106,757

5 Claims. (Cl. 116—129)

The present invention relates to micrometer calipers and is concerned more particularly with improvements in micrometer calipers of the type disclosed in United States Letters Patent to P. J. Darlington, No. 1,652,854, dated December 13, 1927. The present application is a division of application Serial No. 541,138, filed June 24, 1944, now abandoned.

In general, instruments of this type are employed as comparator gages, with the dial calibrated in both directions from a zero or neutral point. To permit setting the dial to zero when the gage is being compared with the reference standard, the dial is rotatably mounted on the instrument casing to permit bringing the zero point in line with the indicator needle. Thereafter, when the gage is used in the work, the deviation or departure from the desired size may be read directly from the dial, and measured with high accuracy.

In the aforesaid Darlington patent, the dial is held in adjusted position by spring pressed means. While this has proved satisfactory for a relatively small-diameter dial, it is not adequate for a dial of large diameter, extending beyond the contour of the body of the gage, since it becomes quite possible inadvertently to displace the dial from its proper setting.

It is therefore one of the objects of the invention to provide a simple and effective construction and mounting for the dial and bezel to facilitate the adjustment and locking of these parts in proper position.

Another object of the invention is to provide indicating means of substantially greater size or scale, so as to permit finer calibration and increased accuracy, without reducing to any substantial degree the linear spacing between scale sub-divisions.

In the accompanying drawings, which illustrate what is considered to be a preferred form of the present invention, Fig. 1 is a front elevation of the complete instrument, with certain of the internal parts shown in broken line; Fig. 2 is a right hand side elevation of the instrument; Fig. 3 is a section on line 3—3 of Fig. 2, showing the construction of dial and bezel and their method of support; Figs. 4 and 5 are views in rear and side elevation, respectively, of the bezel ring, showing the slight relieving of the back surface on the upper portion of such ring, and Fig. 6 is a detail sectional view on a somewhat larger scale, showing the bezel mounting and clamping arrangement.

The present micrometer caliper, like that of Patent No. 1,652,854 above referred to, is designed primarily as a comparator instrument for comparing in the process of production or final inspection, the internal dimension of some particular hole in a piece of work with the desired or specified dimensions as exemplified in a reference standard. The instrument comprises, briefly, a suitable casing in which is mounted the inner end of a cylindrical plug, the outer end of which is split and adapted to be expanded by the outward movement of a taper plunger mounted within the body of the plug. Normally, the plunger is pressed outwardly by means of a spring to expand the end of the plug, but the plunger may be withdrawn inwardly by the finger of the operator against the action of the spring to permit the outer end of the plug to contract to its normal diameter.

The indicating means comprise a dial over which swings a needle or pointer connected to the plunger by a train of amplifying mechanism. In use, the plunger is withdrawn by the operator to permit the measuring outer end of the plug to assume its minimum diameter. The plug is then inserted in the hole to be measured or compared, and the plunger released, whereupon the spring forces the plunger outwardly, expanding the plug until it fits snugly within the hole. The reading of the needle on the dial will then correspond to the longitudinal position of the plunger within the plug and thus with the internal dimension of the hole.

When used as a comparator gage, the dial is calibrated in both directions from a zero or neutral point, and the dial and its mounting are made adjustable so that the zero or neutral point may be brought directly beneath the needle, when the plug is tested in the reference standard. After this adjustment has been made and the dial locked in position, the operator, when using the gage or caliper, need only compare the readings with respect to the zero point on the dial, a plus reading on one side indicating that the hole is too large, and a minus reading on the other side indicating that the hole is too small. With the sub-divisions of the scale known to correspond to definite measurements as, say, to one-tenthousandths of an inch, and the tolerance being given for each particular piece of work, the operator can quickly determine whether the hole being tested is within or without the specified tolerance and, therefore, whether the work is acceptable or is to be rejected.

For each size of hole a separate reference standard is provided and its corresponding calipering plug, the varying sizes of plugs being interchangeable and easily and quickly removed from and replaced in the instrument as occasion requires. Referring to the accompanying drawings in connection with the following detailed description of a specfic form of micrometer caliper embodying the present invention, the casing of the instrument is formed in two parts, a front portion 12, and a rear portion 14. The two parts of the casing are secured together by suitable clamping screws, not shown. Each of these casing portions 12 and 14 is provided with a semi-cylindical clamping face 16 for receiving and securely clamping the internal end 18 of the caliper plug 20 when the casing clamping screws are tightened.

The details of construction of the gage plug and plunger are not shown in the accompanying drawings or herein described, since they are already well known in this art, being substantially identical with these parts as shown and described in the Darlington Patent No. 1,652,854 above referred to. Likewise, the plunger actuating and amplifying mechanism within the casing will not be described. For a description of a preferred form of construction of this mechanism, reference may be had to United States Patent No. 2,472,875, issued June 14, 1949, to Arthur A. Adams.

Preferably, the casing is formed of molded plastic which, because of its light weight, permits a somewhat larger and more easily held casing and the use of a substantially larger indicating dial, without appreciably increasing the over-all weight. Furthermore, the plastic has a much lower rate of heat transference than metal, hence the accuracy of the instrument will not be so apt to be affected by the heat of the hand of the user.

The indicating devices for the instrument comprise the circular dial 30, see Fig. 1, bearing a graduated scale over which swings the needle or pointer 32 in accordance with the expanded diameter of the caliper plug within the hole being measured or compared. As compared with the construction shown in the aforesaid Darlington patent, the dial has been substantially enlarged, and as a consequence overhangs the body of the casing. By this increase in size, it is possible to provide ten scale divisions in the space taken up by five previously, thus enabling the operator to read the instrument with greater ease and to determine with greater accuracy the magnitude of the deviation from standard of the dimension of the object being measured.

The dial assembly is mounted, as shown in Figs. 3 and 6, upon a circular plate or disk 36, conveniently of molded plastic, screwed or otherwise secured to the front upper portion of the section 12 of the casing. This plate or disk is formed with a marginal portion of reduced thickness, and is likewise provided with a central bore or opening 40 for the passage therethrough of the needle spindle 41, registering with a similar opening 42 in the front wall of the casing.

The dial 30 with a backing disk 44 is held upon the circular disk 36 by means of a bezel 46 recessed around its rear face to receive the periphery of the disk 36. The bezel is held on the disk at the front by an internal shoulder or lip 48 overlaying the marginal edge of the dial 30 and holding the same in place. The bezel is provided with the usual under-cut groove 50 to receive the lens or crystal 52 of plastic or other transparent material. The bezel is held upon the disk 36 at the back by means of a re-retaining ring 60 secured to the back face of the bezel with the internal marginal portion of the ring overlying and being received by the reduced marginal portion of the plate 36. Conventional slotted head screws 62 and a single knurled head thumb screw 64 are received in threaded inserts 66 for this purpose.

The parts are so proportioned that when the screws 62 are set up and the locking screw 64 is loosened, the bezel will turn easily upon the disk 36, carrying with it the dial 30 and the backing disk 44 by means of the small projection 58 (see Fig. 4) on the inner face of the bezel ring which engages correspondingly shaped registering notches in the dial and its backing disk.

To enable the bezel and dial to be locked in adjusted position merely by tightening the single locking screw 64, the upper portion 67 of the back face of the bezel is slightly relieved or reduced in thickness, as indicated in Fig. 5, so that when the screw is tightened, the margin of the disk 36 in the vicinity of the screw will be clamped firmly between the dial and backing plate 30 and 44 at the front and the ring 60 at the back. In Fig. 2 the parts are shown in unlocked position, with a somewhat exaggerated open space or clearance between the bezel 46 and the ring 60, while the sectional detail, Fig. 6, shows the ring drawn into clamping position upon tightening the thumb screw 64.

In the operation of the herein described instrument as a comparator, the user or operator first selects the plug 20 which has been provided for the exact diameter desired, inserts it in the instrument, and secures it in position by tightening the casing screws. He then, by pressure on the finger button 68, withdraws the plunger 70 to permit the calipering end 72 of the plug to contract. The end of the plug is then inserted in the hole in the standard and the finger button released to allow the plunger to be advanced under spring pressure until the end of the plug has been expanded to fit snugly within the hole. With the plug still in the hole, the locking screw 64 for the bezel is loosened and the bezel turned, carrying with it the dial, until the neutral or zero point comes directly beneath the end of the pointer or needle. The locking screw is then tightened, after which the finger button is pressed to release the plug from contact with the standard from which it is then removed.

The instrument is now ready for use to determine whether or not the holes in the work have the specified or desired diameter within the variation or tolerance specified as permissible. The operator, in making such determination, merely presses the finger button to permit the end of the plug to contract, inserts such contracted end in the hole to be measured or compared, releases the button and observes the reading of the pointer on the scales. The extent of the deviation of the needle from the neutral or zero mark to one side or the other indicates directly the number of ten-thousands of an inch that the hole varies from the specified diameter and thus whether or not it will be accepted.

From time to time the operator will check the adjustment of his instrument with the standard or test hole, making the proper slight adjustment in dial setting required to bring the needle or pointer directly over the zero mark when the plug is in the test hole. While such adjustment may readily be made, upon loosening the clamp screw slightly, nevertheless the operator is assured that upon completing the adjustment and retightening the screw, the dial setting will be securely retained against displacement in view of the firm clamping that is provided whatever the dial setting may be.

While in the accompanying drawings and the foregoing specification there has been shown and described a specific form of construction embodying the present invention, it is to be understood that the latter is not limited thereto, but may be embodied in other forms and arrangements within the scope of the appended claims.

Having thus described the invention, what is claimed is:

1. In a micrometer caliper having a casing and indicating means carried thereby including a dial, a support for said dial, the support being provided with an annular circumferential rib, a loose clamping ring beneath the annular rib extending beyond the periphery thereof, a bezel mounted to turn upon the support above the annular rib and extending beyond the periphery thereof, the dial being positioned upon the support and arranged to be turned with the bezel to adjust its position, and connections between the ring and the bezel for clamping the ring and bezel against the opposite faces of the rib to lock the bezel and dial in adjusted position.

2. In a micrometer caliper having a casing and indicating means carried thereby including a dial, a support for said dial, the support being provided with an annular circumferential rib, a loose clamping ring beneath the annular rib and extending beyond the periphery thereof, a bezel associated with the dial and mounted to turn on the support, the bezel having an internal annular rabbet to receive the annular rib of the support and the margin of the bezel extending outwardly beyond the rib and overlying the ring, the rabbet being of less axial depth in one section of the bezel than in another, screws uniting the ring and the bezel, the relative axial dimensions of the rabbet and the rib being such that when all the screws are tightly set, the bezel and dial are held from rotation on the support and when the screw adjacent the shallow depth of rabbet is loosened, the bezel and dial may be turned.

3. In a micrometer caliper having a casing and indicating means carried thereby including a calibrated dial mounted for rotational adjustment relative to the casing, dial mounting means comprising a flanged member secured to the casing, a bezel mounted on the flanged member and carrying said calibrated dial, a clamping ring secured to the bezel with the margin of the flanged member intermediate the bezel and the ring, and adjustable clamping means carried by the bezel and ring for drawing said parts into clamping engagement with the flanged member.

4. In a micrometer caliper having a casing and indicating means carried thereby including a calibrated dial mounted for rotational adjustment relative to the casing, dial mounting means comprising a flanged member secured to the casing, a bezel mounted on the flanged member and carrying said calibrated dial, a clamping ring disposed on the opposite side of the flanged member from the bezel, and means comprising both fixed and adjustable elements connecting the bezel and ring, the bezel and ring being rotatable as a unit about the flanged member when held by the fixed connecting elements only, and secured against rotation about the flanged member when the adjustable element is tightened.

5. In a micrometer caliper having a casing and indicating means carried thereby including a calibrated dial mounted for rotational adjustment relative to the casing, a bezel carrying the calibrated dial, a radial mounting flange secured to the casing for supporting the dial and bezel with the dial in front of the flange, a clamping ring behind the flange and secured to the bezel ring with the flange between ring and bezel, and clamping means connecting the ring and the bezel for drawing the ring and bezel together in an axial direction into clamped engagement with the mounting flange.

WILLIAM B. HUNTER.

REFERENCES CITED

The following references are of record in the file of this patent:

UNITED STATES PATENTS

| Number | Name | Date |
|---|---|---|
| 1,490,896 | Green | Apr. 15, 1924 |
| 1,497,372 | Green | Jan. 10, 1924 |